(12) United States Patent
Fujioka et al.

(10) Patent No.: US 10,635,747 B2
(45) Date of Patent: Apr. 28, 2020

(54) INPUT DEVICE, FORM INPUTTING METHOD, NON-TRANSITORY RECORDING MEDIUM AND PROGRAM

(71) Applicant: Rakuten, Inc., Tokyo (JP)

(72) Inventors: Mio Fujioka, Tokyo (JP); Yuri Nishigami, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 15/531,054

(22) PCT Filed: Dec. 3, 2014

(86) PCT No.: PCT/JP2014/081957
§ 371 (c)(1),
(2) Date: May 26, 2017

(87) PCT Pub. No.: WO2016/088217
PCT Pub. Date: Jun. 9, 2016

(65) Prior Publication Data
US 2017/0329759 A1 Nov. 16, 2017

(51) Int. Cl.
*G06F 17/24* (2006.01)
*G06F 3/0481* (2013.01)
*G06F 9/451* (2018.01)
*G06F 17/21* (2006.01)
*G06Q 10/10* (2012.01)

(52) U.S. Cl.
CPC .......... *G06F 17/243* (2013.01); *G06F 3/0481* (2013.01); *G06F 9/453* (2018.02); *G06F 17/218* (2013.01); *G06Q 10/10* (2013.01)

(58) Field of Classification Search
CPC ..................................................... G06F 17/243
USPC .......................................................... 715/226
See application file for complete search history.

(56) References Cited

U.S. PATENT DOCUMENTS

| | | | |
|---|---|---|---|
| 5,367,619 A * | 11/1994 | Dipaolo | G06F 3/0489 715/221 |
| 2007/0113168 A1* | 5/2007 | de Souza | G06F 17/243 715/210 |
| 2009/0119575 A1* | 5/2009 | Velusamy | G06F 17/243 715/226 |

(Continued)

FOREIGN PATENT DOCUMENTS

JP 2011-171989 A 9/2011

*Primary Examiner* — Keith D Bloomquist
(74) *Attorney, Agent, or Firm* — Sughrue Mion, PLLC

(57) ABSTRACT

A display (11) displays a form containing multiple input fields. A detector (12) detects an operation given by a user. A query generator (13) generates, when the detector (12) detects an inputting and editing operation for a character string in any of the multiple input fields, a query for retrieval in a database (19) based on a character string having been input, and accepts a matching result with the query. The display (11) displays, when the number of accepted results is equal to or smaller than a predetermined threshold, the results together with the form. A compensator (14) (a) inputs an extracted character string from the selected result to the empty input field, and (b) compensates an input operation by giving an alert when the character string that has been input into the input field not empty contradicts the extracted character string from the selected result for the input field.

12 Claims, 13 Drawing Sheets

(56) References Cited

U.S. PATENT DOCUMENTS

2010/0280821 A1* 11/2010 Tiitola ................. G06F 17/276
                                                    704/200
2012/0166929 A1*  6/2012 Henderson ........... G06F 17/243
                                                    715/224

* cited by examiner

INPUT DEVICE, FORM INPUTTING METHOD, NON-TRANSITORY RECORDING MEDIUM AND PROGRAM

CROSS REFERENCE TO RELATED APPLICATIONS

This application is a National Stage of International Application No. PCT/JP2014/081957, filed Dec. 3, 2014, the contents of which are incorporated herein by reference in its entirety.

TECHNICAL FIELD

The present disclosure relates to an input device, a form inputting method, a non-transitory recording medium, and a program.

BACKGROUND ART

In recent years, information handling by a system has become common, and inputting of information by a user to such a system is also common. When the user inputs information to the system, in many cases, the user inputs the information via an input form presented by the system. The term input form indicates a format that contains input fields displayed individually for each entry of the information to be input by the user. The system displays the input form to the user, and accepts information input by the user into each input field as input data.

When the user inputs information via the input form, and when, in particular, there is a large number of input fields, the details in a given input field and those in the other input fields may have a contradiction. In addition, when the user who attempts to input information knows information for a given entry (for example, an address), but does not know information for the other corresponding entry (for example, a postal code), inputting of the information to the input form has some difficulties in this case. In order to cope with such a case, there is already known a technology of supporting the inputting operation by the user.

For example, Patent Literature 1 discloses a processing device which extracts, based on a character string input into a specific field (first field), candidate words for the other specific field (second field), and which compensates or corrects an input character string to the second field based on the extracted words.

CITATION LIST

Patent Literature

Patent Literature 1: Unexamined Japanese Patent Publication Kokai Publication No. 2011-171989

SUMMARY OF INVENTION

Technical Problem

According to the above technology, however, there is sometimes a case in which an inputting error on the input form is not addressed.

According to the technology disclosed in Patent Literature 1, based on the character string input into the specific field (first field), the details in the other specific field (second field) can be compensated or corrected. However, the relationship between the field (first field) to which source data is input, and the field (second field) subjected to the compensation or correction is not flexible, and according to this processing device, the details of the first field is not correctable based on the character string input into the second field. Hence, when improper information has been input into the first field, according to conventional technologies, an inputting error on the input form is not fully addressed.

The present disclosure has been made in view of the foregoing technical problems. That is, an objective of the present disclosure is to suppress an inputting error caused when a user inputs information to the input form.

Solution to Problem

In order to accomplish the above objective, an input device according to a first aspect of the present disclosure includes:

a display that displays a form containing a plurality of input fields inputtable in an arbitrary order;

a detector that detects an operation given by a user; and a query generator that generates, when an inputting and editing operation for a character string in any of the plurality of input fields is detected, a query for retrieval in a database based on a character string having been input into the input field not empty among the plurality of input fields, and accepts a matching result with the query, in which:

the display displays, when the number of accepted results is equal to or smaller than a predetermined threshold, the results together with the form; and the input device further comprises a compensator that, when an instruction operation of selecting any of the displayed results is detected:

(a) inputs an extracted character string from the selected result to the empty input field among the plurality of input fields, the selected result being selected for the empty input field; and (b) compensates an input operation to the plurality of input fields by giving an alert when the character string that has been input into the input field not empty contradicts the extracted character string from the selected result for the input field.

In order to accomplish the above objective, a form inputting method according to a second aspect of the present disclosure includes:

a displaying step of displaying a form containing a plurality of input fields inputtable in an arbitrary order;

a detecting step of detecting an operation given by a user; and a query generating step of generating, when an inputting and editing operation for a character string in any of the plurality of input fields is detected, a query for retrieval in a database based on a character string having been input into the input field not empty among the plurality of input fields, and accepting a matching result with the query, in which:

in the displaying step, when the number of accepted results is equal to or smaller than a predetermined threshold, the results are displayed together with the form; and the method further comprises a compensating step of, when an instruction operation of selecting any of the displayed results is detected:

(a) inputting an extracted character string from the selected result to the empty input field among the plurality of input fields, the selected result being selected for the empty input field; and (b) compensating an input operation to the plurality of input fields by giving an alert when the character string that has been input into the input field not empty contradicts the extracted character string from the selected result for the input field.

In order to accomplish the above objective, a non-transitory recording medium according to a third aspect of the present disclosure has stored therein a program that causes a computer to execute:

a displaying procedure of displaying a form containing a plurality of input fields inputtable in an arbitrary order;

a detecting procedure of detecting an operation given by a user; and a query generating procedure of generating, when an inputting and editing operation for a character string in any of the plurality of input fields is detected, a query for retrieval in a database based on a character string having been input into the input field not empty among the plurality of input fields, and accepting a matching result with the query, in which:

in the displaying procedure, when the number of accepted results is equal to or smaller than a predetermined threshold, the results are displayed together with the form; and the program further causes the computer to, when an instruction operation of selecting any of the displayed results is detected, a compensating procedure of:

(a) inputting an extracted character string from the selected result to the empty input field among the plurality of input fields, the selected result being selected for the empty input field; and (b) compensating an input operation to the plurality of input fields by giving an alert when the character string that has been input into the input field not empty contradicts the extracted character string from the selected result for the input field.

In order to accomplish the above objective, a program according to a fourth aspect of the present disclosure causes a computer to execute:

a displaying procedure of displaying a form containing a plurality of input fields inputtable in an arbitrary order;

a detecting procedure of detecting an operation given by a user; and a query generating procedure of generating, when an inputting and editing operation for a character string in any of the plurality of input fields is detected, a query for retrieval in a database based on a character string having been input into the input field not empty among the plurality of input fields, and accepting a matching result with the query, in which:

in the displaying procedure, when the number of accepted results is equal to or smaller than a predetermined threshold, the results are displayed together with the form; and the program further causes the computer to, when an instruction operation of selecting any of the displayed results is detected, a compensating procedure of:

(a) inputting an extracted character string from the selected result to the empty input field among the plurality of input fields, the selected result being selected for the empty input field; and (b) compensating an input operation to the plurality of input fields by giving an alert when the character string that has been input into the input field not empty contradicts the extracted character string from the selected result for the input field.

Advantageous Effects of Invention

According to the present disclosure, an inputting error caused when a user inputs information to an input form can be suppressed.

DESCRIPTION OF EMBODIMENTS

Embodiments of the present disclosure will be explained with reference to the accompanying figures.

Embodiment

An input device 10 according to an embodiment of the present disclosure is a device that accepts information input by a user. The input device 10 has typical functions to collect information via a form, for example, functions to display an input form for each entry of information to be input by the user, and to accept input information into each input field as input data.

The input device 10 of this embodiment is a device that accepts inputting of information on a commercial product when a user (for example, a manager or a responsible person of a store) who is selling commercial products to customers over the Internet creates a commercial product page to sell the commercial product to the customers. In particular, this device supports the user to create the commercial product page by, for example, automatically inputting information into an input field not filled yet, detecting and correcting an inputting error in an already-filled input field based on information that has been input by the user in an input form. In this case, the term "input" means an action to add a character string to an empty input field, and the term "edit"

means an action to delete, replace, add, and the like, the character string that has been input into an input field which is not empty.

According to this embodiment, the input device 10 is a kind of terminal device that allows the user who is the store manager to directly operate, and is connected with an e-marketplace server (a server which possesses commercial product pages created by multiple stores, and which makes such commercial product pages available to the public over the Internet as websites) via a network. When the user creates the commercial product page, the user accesses the e-marketplace server via the web browser of the input device 10, and carries out an operation to create the commercial product page. The input device 10 receives a HyperText Mark-up Language (HTML) document containing an instruction to form an input form provided by the e-marketplace server. When the input device 10 executes, for example, a job script (scripts described in JavaScript, (registered trademark), and the like) contained in the received HTML document or present at the linked destination described on the HTML document, the input form to provide information to the e-marketplace server is displayed on the screen of the input device 10.

Figure 1:
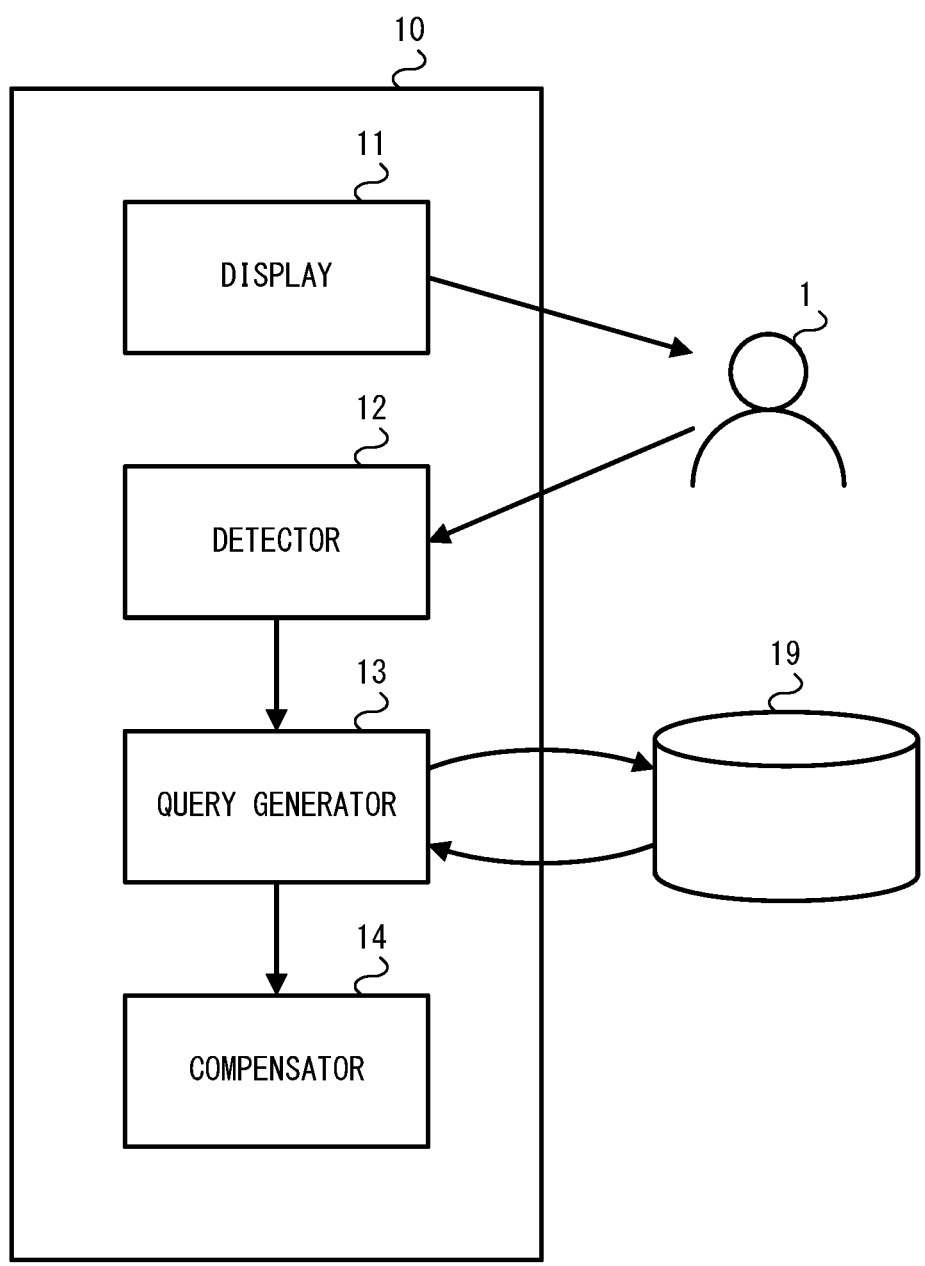
FIG. 1 is a block diagram illustrating a functional structure of an input device according to an embodiment of the present disclosure.

As illustrated in FIG. 1, the input device 10 according to this embodiment includes, in functional aspects, a display 11, a detector 12, a query generator 13, and a compensator 14.

The display 11 displays, for a user 1, a form containing multiple input fields that can be filled in an arbitrary order.

The detector 12 detects, when the user 1 inputs a character string into the input field of the form displayed by the display 11, the operation given by the user 1.

When the inputting or editing operation for the character string by the user 1 to any input field displayed by the display 11 is detected, the query generator 13 generates a query for retrieval in a database 19 based on the character string that has been input into the input field. In addition, the query generator 13 accepts a result (a matching result with the query) returned from the database 19 relative to the generated query. In this embodiment, the database 19 is expected to be present in the e-marketplace server, but the present disclosure is not limited to this structure, and such a database may be present in the input device 10, or may be in other devices.

Note that when the number of results accepted by the query generator 13 is equal to or smaller than a predetermined threshold, the display 11 displays the accepted results by the query generator 13 together with the form.

The compensator 14 accepts the displayed results by the display 11, automatically compensates the details of the input field based on a user instruction, or gives an alert when the details of the input fields contain a contradiction. More specifically, when the detector 12 detects an operation given by the user 1 that instructs a selection of any one of the displayed results, the compensator 14 automatically inputs a character string extracted from the selected result by the user 1 in an input field not filled yet. Alternatively, when the character string already input into the input field and the character string extracted from the selected result by the user 1 have a contradiction, the compensator 14 gives an alert to the user 1. In this case, the term contradiction indicates a relationship in which extracted information from the database 19 based on the selected result by the user 1 is inconsistent with the character string already input into the input field. The compensator 14 compensates the inputting operation into the input field displayed by the display 11 in this way.

By employing the above structure, based on the details input by the user 1 into the input field, the input device 10 automatically inputs information to be input into an input field not filled yet, or gives an alert to the user 1 when there are input details contradicting each other. Hence, the input device is capable of suppressing an inputting error by the user 1. In addition, since the input device is capable of executing such processes without any retrieval instruction from the user, the user is enabled to keep inputting to the form without a special operation, thereby reducing the efforts by the user.

Figure 2:
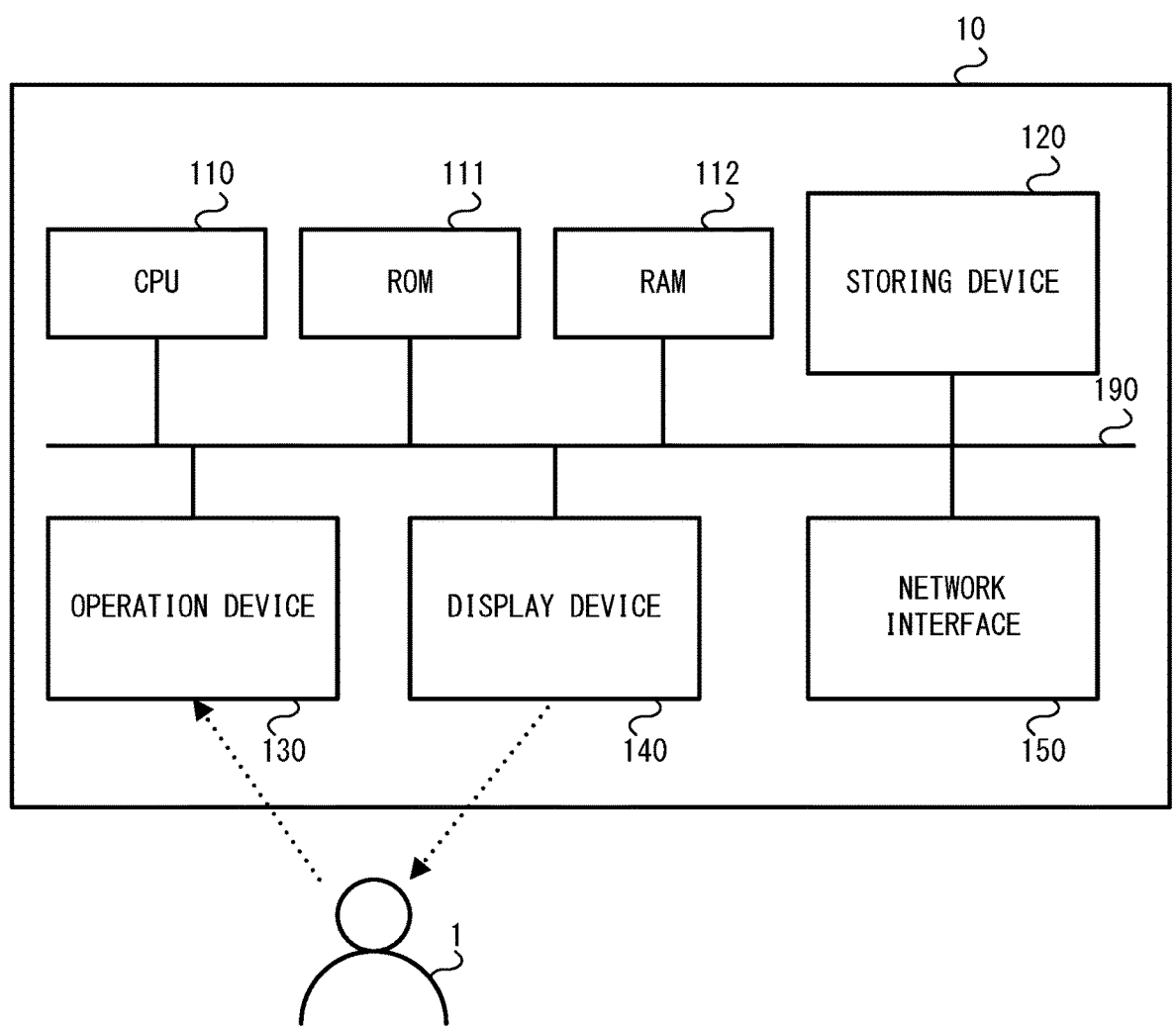
FIG. 2 is a block diagram illustrating a hardware structure of the input device.

As illustrated in FIG. 2, in view of the hardware aspect, the input device 10 of this embodiment includes a Central Processing Unit (CPU) 110, a Read Only Memory (ROM) 111, a RAM (Random Access Memory) 112, a storing device 120, an operation device 130, a display device 140, and a network interface 150, and those are connected with one another via an internal bus 190.

The CPU 110 that executes programs stored in the ROM 111, the RAM 112, and the storing device 120 controls the input device 10 entirely. The CPU 110 reads the program to be executed from the ROM 111, the RAM 112, and the storing device 120 as needed, and saves data in the RAM 112 and the storing device 120 as needed.

The ROM 111 stores the necessary programs for the activating CPU 110, for example, the program initially executed by the CPU 110 at the time of activation of the input device 10, and the like.

The RAM 112 functions as a work area when the CPU 110 executes the program. That is, the RAM 112 records the program being executed by the CPU 110 or data temporarily necessary for the CPU 110 to execute the program, and provides such program and data to the CPU 110 in accordance with a request therefrom.

The storing device 120 includes storing hardware, such as a hard disk or a flash memory, and stores necessary data to actuate the input device 10. In particular, the storing device may record the database 19 to be explained later.

The storing device 120 records, for example, the program to be executed by the CPU 110, or data to be referred by the CPU 110 that is executing the program, and provides such program and data to the CPU 110 in accordance with a request therefrom. In addition, the storing device 120 records data output by the CPU 110 in accordance with a request therefrom.

The operation device 130 includes a keyboard, a mouse, and the like, and accepts an inputting operation given by the user 1, and transmits the details of the accepted operation to the CPU 110.

The display device 140 includes a liquid crystal display or a cathode-ray tube monitor, and displays necessary information for the user 1.

The network interface 150 connects the input device 10 with a network (unillustrated). When the input device 10 sends information to another device or receives information from such another device via the network, the network interface 150 sends, to such another device via the network, information received from the CPU 110 via the internal bus 190 to be explained later, or sends, to the CPU 110 via the internal bus 190, information received from such another device via the network. As an example, the input device 10 gives a query to the database 19 of the unillustrated e-marketplace server via the network interface 150, and accepts a matching result with the query from the database 19.

The network interface 150 may connect the input device 10 with the network via, for example, a cable, or may connect the input device 10 with the network by wireless communication.

The internal bus 190 relays information exchange among the components of the input device 10 (CPU 110, ROM 111, RAM 112, storing device 120, operation device 130, display device 140, network interface 150, and the like). When, for example, the CPU 110 reads necessary data from the storing device 120, the CPU 110 reads the data from the storing device 120 via the internal bus 190.

The input device 10 causes the respective hardware resources explained above to cooperatively operate with one another, thereby functioning as the elements that accomplish the above respective functions (display 11, detector 12, query generator 13, and compensator 14). When, for example, the CPU 110 displays an input form to be explained later for the user via the display device 140, the function as the display 11 is accomplished. In addition, when the CPU 110 detects a user operation via the operation device 130, the function as the detector 12 is accomplished. The same is true of the query generator 13 and the compensator 14, and the details thereof will be explained later.

In this embodiment, the database 19 to which the query is given from the query generator 13 or which causes the query generator 13 to accept a retrieval result may be owned by the input device 10 or may be owned by devices other than the input device 10. When the input device 10 includes the database 19, the database 19 is recorded in the storing device 120. When the devices other than the input device 10 includes the database 19, the input device 10 gives a query to the database 19 via the network interface 150, or accepts a retrieval result via the network interface.

As for retrieval in the database 19, a retrieval is executed based on a partial match retrieval. Hence, when a query contains multiple character strings as retrieval words, a retrieval result does not always contain all retrieval words. Depending on the case, a content that is a contradicting retrieval result with the character string contained in the query is returned.

In addition, according to this embodiment, the input device 10 includes the operation device 130 and the display device 140, but the present disclosure is not limited to this structure. For example, the input device 10 may accept a user operation or display information for the user through a network connection via the network interface 150. In this case, the user inputs an instruction to the input device via an operation device of another device connected with the input device via the network, and accepts information from the input device via a display device of such another device.

Figure 3:
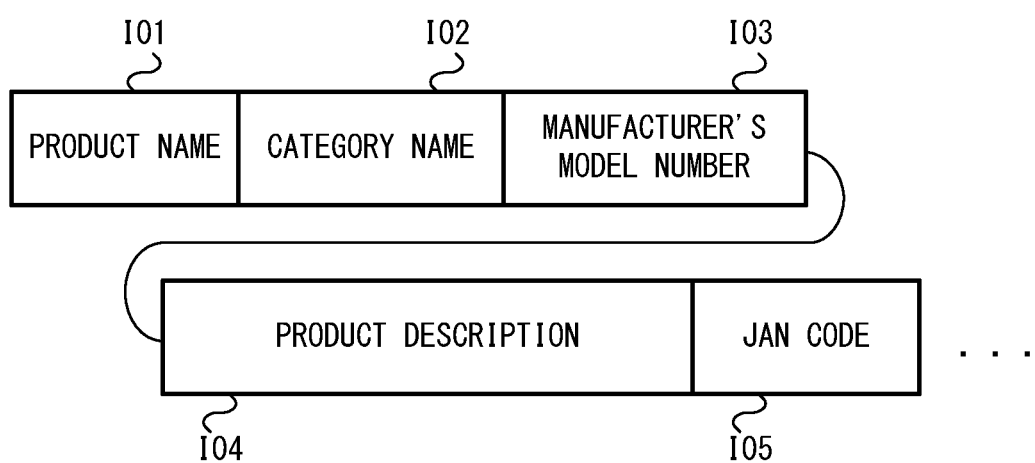
FIG. 3 is a diagram illustrating an example record recorded in a database.

The database 19 records multiple records each having multiple pieces of character string data associated with one another. As illustrated in FIG. 3, a record R1 contained in the database 19 contains, for example, character string data 101 with an attribute that is "product name", character string data 102 with an attribute that is "category name", character string data 103 with an attribute that is "manufacturer's model number", character string data 104 with an attribute that is "product description", and character string data 105 with an attribute that is "Japanese Article Number (JAN) code", and employs a data structure in which those pieces of data are associated with one another. In addition, the record R1 may further contain character string data with other attributes, such as "price".

Figure 4:
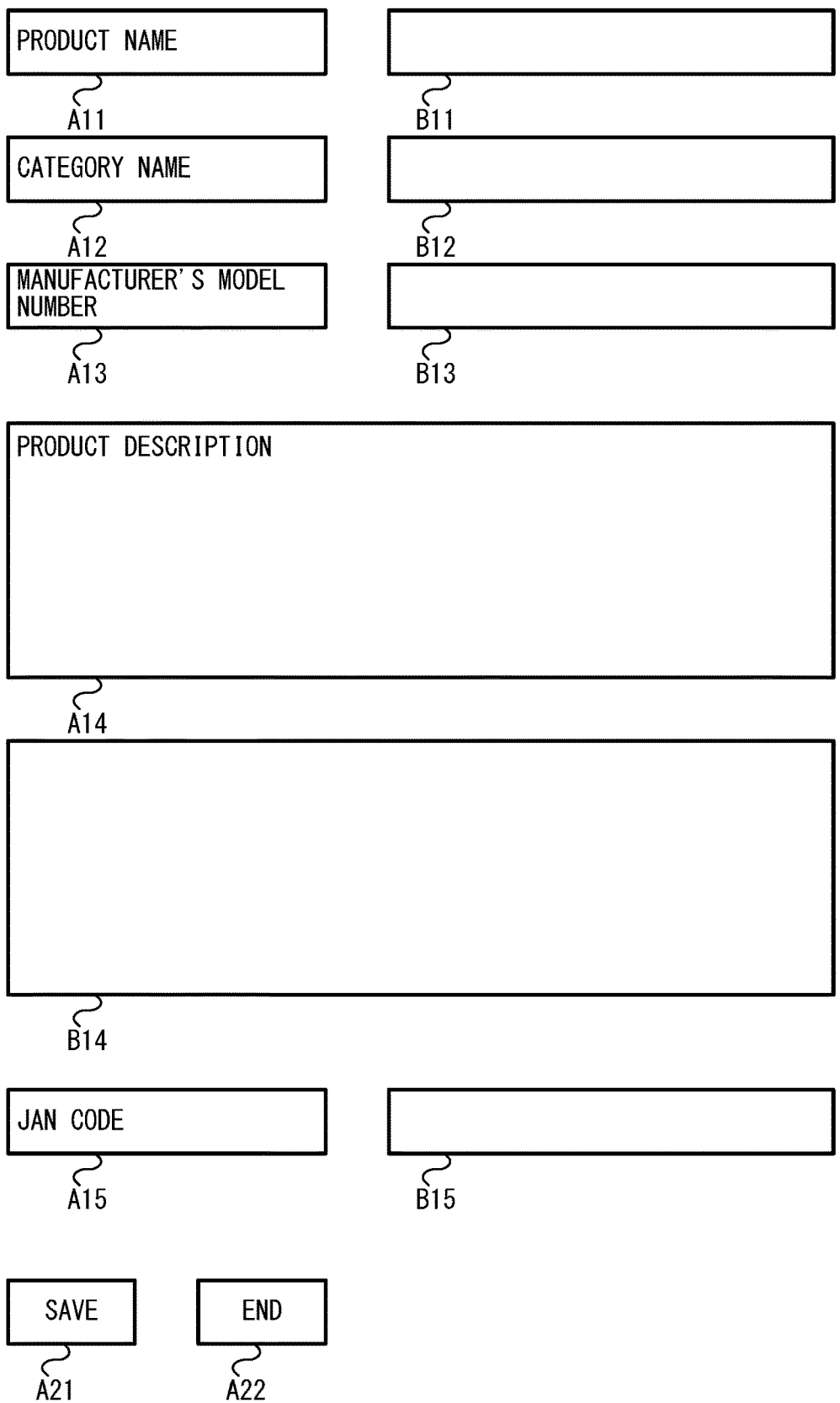
FIG. 4 is a diagram illustrating an example input form.

The display 11 displays an input form exemplified in FIG. 4. The input form includes, for example, input fields (input fields A11 to A15), example input fields (B11 to B15), a save button A21, and an end button A22.

The input field is a field capable of accepting a character string input by the user 1, and displaying the accepted character string. The input form includes multiple input fields that can be filled in an arbitrary order. The input field is provided for each entry (attribute) to be accepted by the input device 10, and corresponds to each attribute. In the example illustrated in FIG. 4, the input form contains the input field A11 that accepts an inputting of the attribute "product name", the input field A12 that accepts an inputting of the attribute "category name", the input field A13 that accepts an inputting of the attribute "manufacturer's model number", the input field A14 that accepts an inputting of the attribute "product description", and the input field A15 that accepts an inputting of the attribute "JAN code".

In addition, the input form includes the example input field corresponding to each input field. The example input field is a display field to display a message that contains an alert and other information to the user 1. In the example illustrated in FIG. 4, the example input field B11 corresponding to the input field A11 for the attribute "product name", the example input field B12 corresponding to the input field A12 for the attribute "category name", the example input field B13 corresponding to the input field A13 for the attribute "manufacturer's model number", the example input field B14 corresponding to the input field A14 for the attribute "product description", and the example input field B15 corresponding to the input field A15 for the attribute "JAN code" are illustrated.

The input device 10 accepts an inputting operation by the user 1 into each input field displayed by the display 11, and provides a function of editing the character string in each input field. When the user 1 clicks the save button A21, the input devices 10 associates the character strings input into the respective input fields to create a record, and records the created record in the database 19 present in the e-marketplace server. In addition, when the user 1 clicks the end button A22, the input device ends the acceptance of information via the input form. Still further, the input device 10 has general functions of accepting information input on an information device, but the details thereof will be omitted in the present application.

Yet still further, when the user 1 inputs a character string into the input field via the operation device 130, the input device 10 detects the operation of inputting the character string, generates a query of retrieving in the database 19 based on the input character string, and starts a candidate displaying process. Conversely, in order to accept the operation by the user 1 while simultaneously executing the candidate displaying process, the input device 10 executes the candidate displaying process as a so-called background job. An explanation will now be given of the candidate displaying process by the input device 10.

Figure 5:
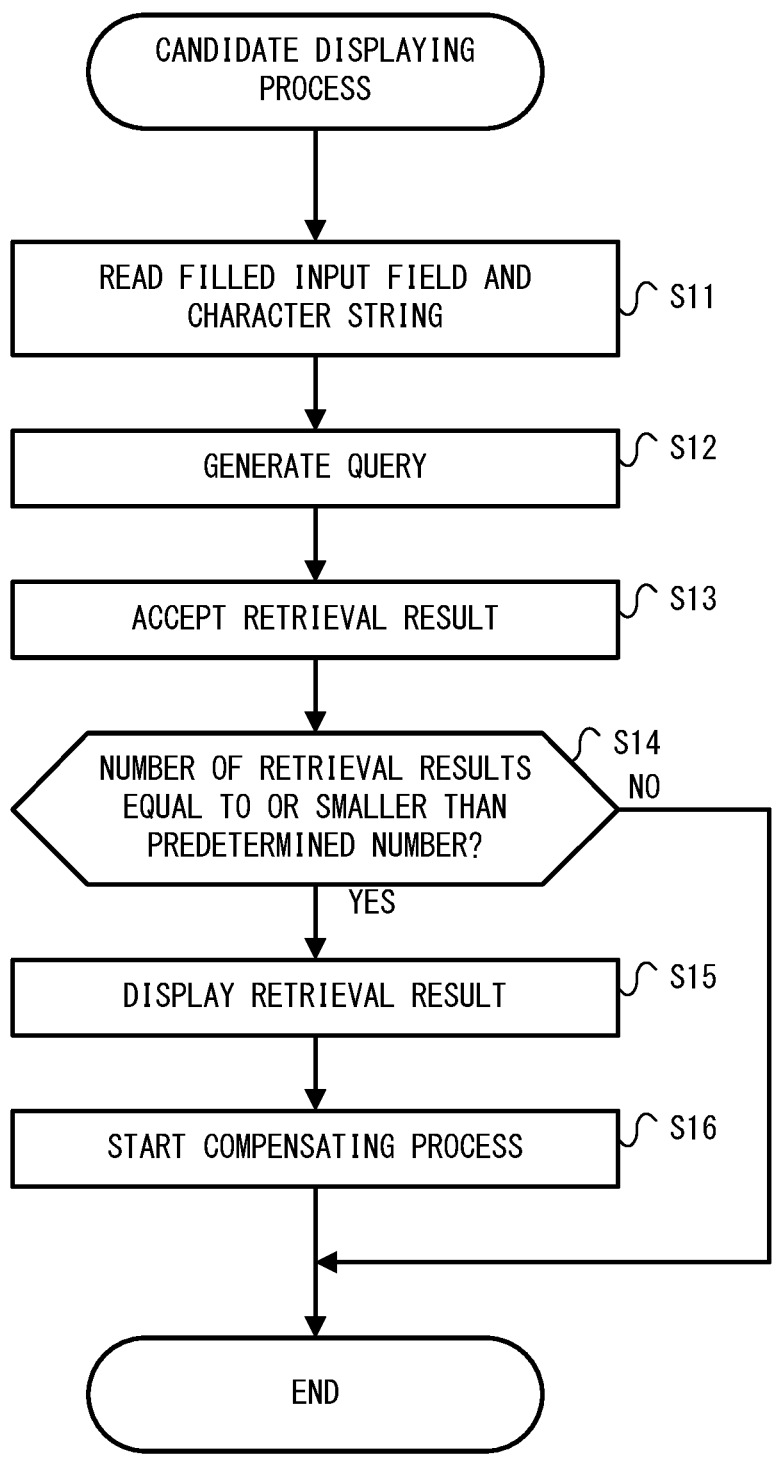
FIG. 5 is a flowchart illustrating a candidate displaying process.

When the detector 12 detects that a character string is input into any input field by the user 1, the input device 10 starts the candidate displaying process illustrated in FIG. 5.

At the beginning of the candidate displaying process, the CPU 110 detects (step S11) the input field and the input character string both input by the user 1. More specifically, the detector detects to which input field (A11 to A15) in the input form the user 1 has input the character string, and detects the character string that has input into the input field where the inputting operation is detected.

Next, the CPU 110 generates (step S12) a query for retrieving in the database 19. More specifically, the CPU 110 associates the character string input into the input field filled with that character string with the attribute of the input field, and generates a query that contains those information (input character string and associated attribute). The CPU 110 gives the generated query to the database 19.

When there are multiple input fields in step S12 that have been filled with respective character strings, the CPU 110 associates the multiple character strings that have been input into the respective multiple input fields with the attributes of the respective multiple filled input fields, generates a single query containing the respective input character strings and all associated attributes, and gives such a query to the database 19.

When the CPU 110 gives the query, a retrieval in the database 19 is executed in accordance with the query. More specifically, in the database 19, a record that contains the character string contained in the query as the attribute associated with the character string in such a query is retrieved. When such a record is present in the database 19, the record is returned as a retrieval result. When the query contains multiple character strings, a record containing each character string as the associated attribute is retrieved by partial match retrieval. When the retrieval ends, a retrieval result that is a matching result is returned from the database 19. At this time, the number of matching results is not limited to any particular number, and may be zero when there is no such record, and may be a multiple number when there are multiple records.

When a retrieval result from the database 19 is returned, the CPU 110 accepts (step S13) the returned retrieval result. More specifically, the returned result from the database 19 is recorded in the RAM 112 or the storing device 120. By executing the processes in step S12 and in step S13, the CPU 110 accomplishes the function as the query generator 13.

Next, the CPU 110 determines (step S14) whether or not the number of accepted results in step S13 is equal to or smaller than a predetermined threshold. More specifically, the results recorded in the RAM 112 or the storing device 120 and returned from the database 19 are referred, and the number of contained records therein is counted, and the determination on whether or not such a number is equal to or smaller than the predetermined threshold is made. When determining (step S14: NO) that the number of results is not equal to or smaller than the predetermined threshold, the CPU 110 directly ends the candidate displaying process.

When determining in step S14 (step S14: YES) that the number of results is equal to or smaller than the predetermined threshold, the CPU 110 displays (step S15) the accepted results in step S13 together with the input form. More specifically, the CPU 110 displays the character string contained in the returned result from the database 19 on the input form that is being displayed so as to enable the user to understand that such a character string is a candidate for the input field corresponding to the associated attribute with the character string. At this time, when there are multiple retrieval results in the returned content from the database 19, the contained character string in each result is displayed for each input field.

When the process in step S15 ends, the CPU 110 starts (step S16) a compensating process. When the compensating process starts, the CPU 110 ends the candidate display process.

Figure 6:
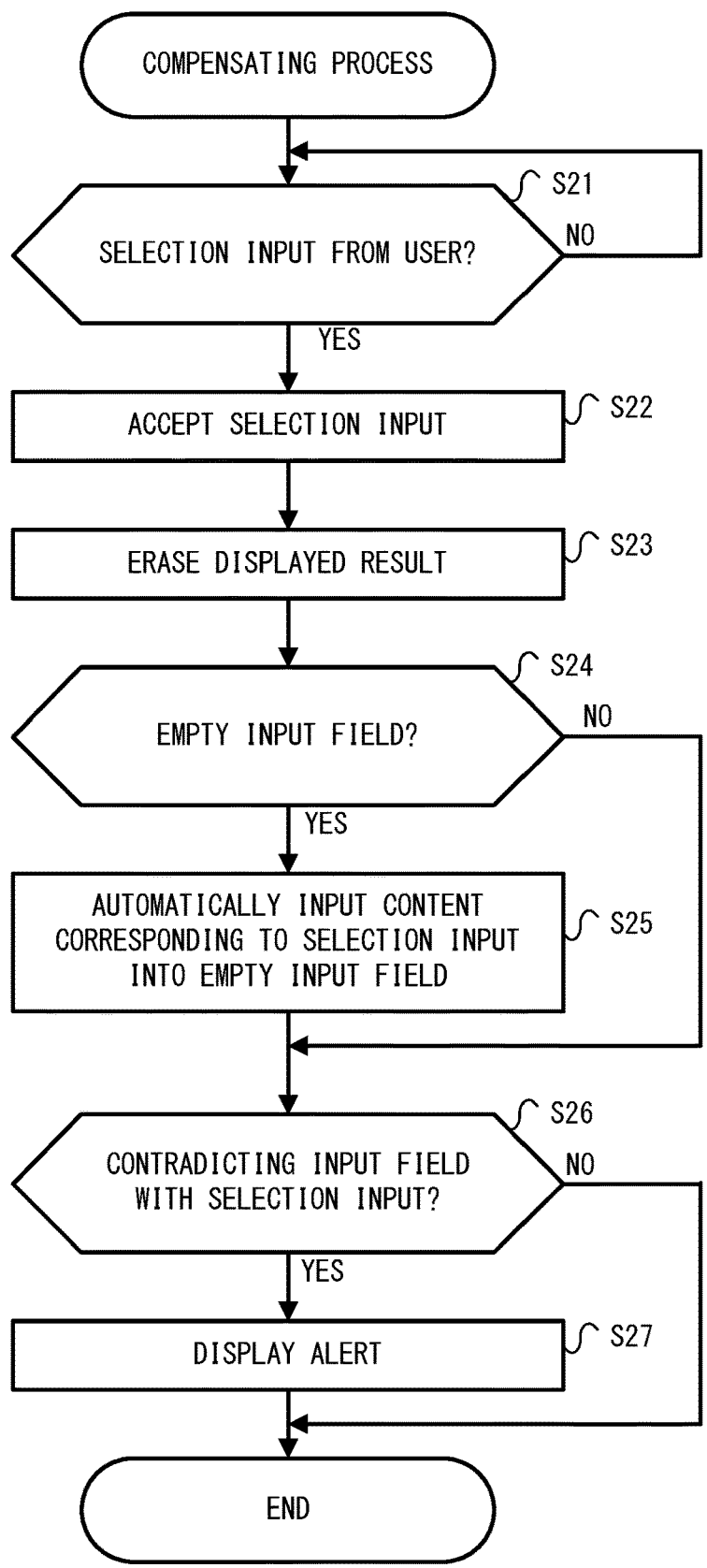
FIG. 6 is a flowchart illustrating a compensating process.

Next, with reference to FIG. 6, the compensating process by the input device 10 will be explained. When the compensating process starts, as explained above, the input device 10 is displaying the retrieval result that has been retrieved in the candidate displaying process.

At the beginning of the compensating process, the CPU 110 determines (step S21) whether or not there is an inputting operation by the user 1 to the result displayed in the candidate displaying process. More specifically, when there is only one result in the displayed content, and when the user 1 clicks the displayed result, the CPU 110 determines that there is an inputting operation by the user. When the displayed content contains multiple results, and when the user 1 clicks one of the displayed multiple results, the CPU 110 determines that there is an inputting operation by the user. When there is no inputting operation (step S21: NO), the CPU 110 stands by until an inputting operation is given.

When the inputting operation by the user 1 is given in step S21 (step S21: YES), the CPU 110 accepts (step S22) a selection input given by the user 1. More specifically, the CPU 110 reads a clicked portion by the user 1, and accepts, as a selection input given by the user 1 (selected result), the details of the result displayed at the read portion (character string displayed at clicked portion and attribute of such character string).

Next, upon acceptance of the selection input given by the user 1, the CPU 110 erases (step S23) the retrieval result that has been being displayed. Consequently, the input form is displayed on the display device 140.

Subsequently, the CPU 110 determines (step S24) whether or not there is any empty input field (input field to which no character string is input, input form not filled yet) in the displayed input form. More specifically, the CPU 110 checks whether or not each input field displayed in the input form has already been filled with a character string by the user, and determines whether or not there is any input field to which no character string has been input yet.

When determining (step S24: YES) that there is an empty input field, the CPU 110 automatically inputs (step S25) details corresponding to the selection input. More specifically, the CPU 110 reads the returned retrieval result from the database 19, and extracts the corresponding record to the selection input given by the user. In addition, the CPU 110 extracts a character string with a corresponding attribute to the input field determined as being empty. The CPU 110 inputs the extracted character string into the input field determined as being empty. Note that when there are multiple input fields determined as being empty, respective extracted character strings are input into the input fields determined as being empty.

After step S25, or when the CPU determines (step S24: NO) in step S24 that there is no empty input field, next, the CPU 110 determines (step S26) whether or not there is any contradicting input field with the selection input. More specifically, the CPU 110 extracts, from the retrieval result returned from the database 19, a corresponding record to the selection input given by the user. In addition, the CPU 110 compares the character string input into each input field at this time point with a character string with a corresponding attribute to each input field in the extracted record. Upon comparison, when the character string input into a given input field is inconsistent with the character string with the corresponding attribute in the extracted record, the CPU 110 determines that there is a contradicting input field with the selection input. Conversely, when all character strings input into all input fields are consistent with the respective character strings with the corresponding attributes in the record from which the respective input character strings are extracted, the CPU determines that there is no contradicting input field with the selection input.

When determining (step S26: YES) that there is a contradicting input field with the selection input, the CPU 110 displays (step S27) an alert for the input field from which the contradiction is detected. More specifically, as for the input field that has the character string input therein and being inconsistent with the character string input with the corresponding attribute in the extracted record, an alert message for causing the user to pay attention is displayed in the corresponding example input field to that input field. When there are multiple input fields that have respective contradictions detected, for each input field from which the contradiction is detected, the alert message is displayed in the corresponding example input field. By referring to the example input field, the user 1 can know that a character string that should not be filled in the input field in nature has been input.

After step S27, or when the CPU determines (step S26: NO) that there is no contradicting input field with the selection input, the CPU 110 ends the compensating process.

During the execution of the candidate displaying process or compensating process explained above, when the detector 12 detects an input operation by the user 1, the input device 10 ends the retrieval process or compensating process that is being executed. In addition, the input device 10 generates a new query based on the character string that has been input by the user 1 so far, and starts the candidate displaying process. According to such a procedure, every time the user inputs a character string into the input field in the form, the user 1 is capable of referring to the retrieval result corresponding to the input character string without a special operation. When the retrieval result is displayed, the user 1 can keep inputting the character string into the input field in the form regardless of the displayed retrieval result, or can select one of the displayed candidates.

Figure 7:
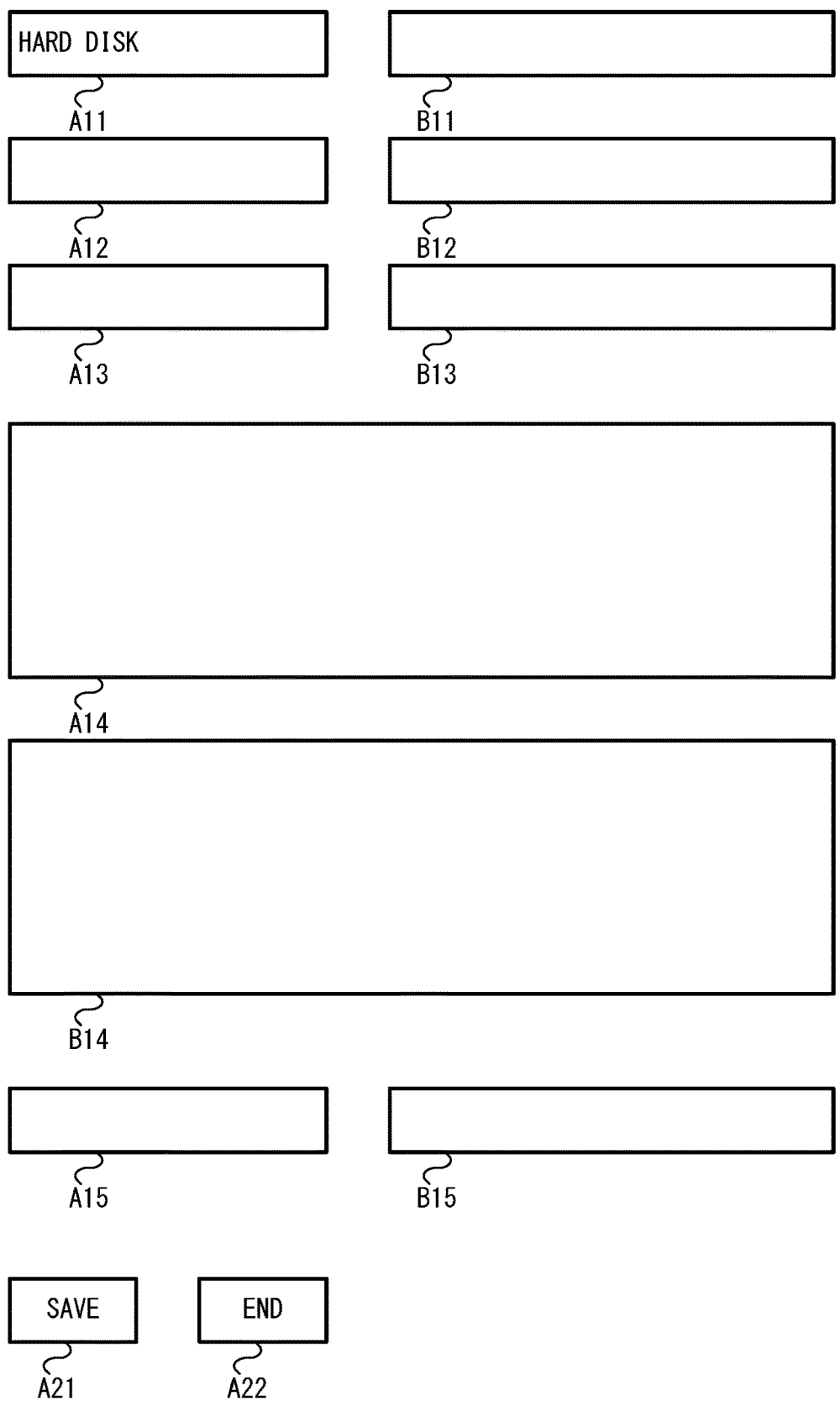
FIG. 7 is a diagram illustrating an example input form that has an input field filled with a character string by a user.

Hereinafter, with reference to the input form directly, the candidate displaying process and the compensating process explained above will be explained. As an example, as illustrated in FIG. 7, an explanation will be given of a case in which the user 1 inputs a character string "hard disk" into the input field A11 that accepts an inputting of a character string with the attribute "product name".

When the user 1 inputs the character string "hard disk" into the input field A11 contained in the input form, the input device 10 detects, by the function of the detector 12, that an operation of inputting the character string "hard disk" into the input field A11 has been given. In addition, the input device 10 gives, by the function of the query generator 13, a query for retrieval in the database 19 based on the character string ("hard disk") that has been input into the input field (A11) which is not empty. This query contains, in addition to the character string "hard disk", information indicating the attribute (product name) of the input field A11 to which that character string has been input.

When the input device 10 receives a retrieval result in the database 19, the input device 10 evaluates the results (determines whether or not the number of results is equal to or smaller than the predetermined threshold), and displays the matching result with the determination criteria together with the input form. In the example illustrated in FIG. 8, retrieval results for the input field A12 indicating the category name are displayed as a result window C12. This means that, as retrieval results, the character strings corresponding to the attribute "category name" are returned by what corresponds to the number that is equal to or smaller than the predetermined threshold, and the input device 10 displays such results together with the input form. In the example illustrated in FIG. 8, as retrieval results, a total of three character strings that are "personal computer peripheral device", "external storage drive", and "home electric appliances" are displayed in the result window C12.

Conversely, as for the input field A13 corresponding to the attribute "manufacturer's model number", the input field A14 corresponding to the attribute "product description", and the input field A15 corresponding to the attribute "JAN code", no retrieval result is displayed. This means that, upon retrieval based on the product name "hard disk", the number of retrieval results for each attribute is too large and exceeds the predetermined threshold, and thus the input device 10 does not display such results.

Figure 8:
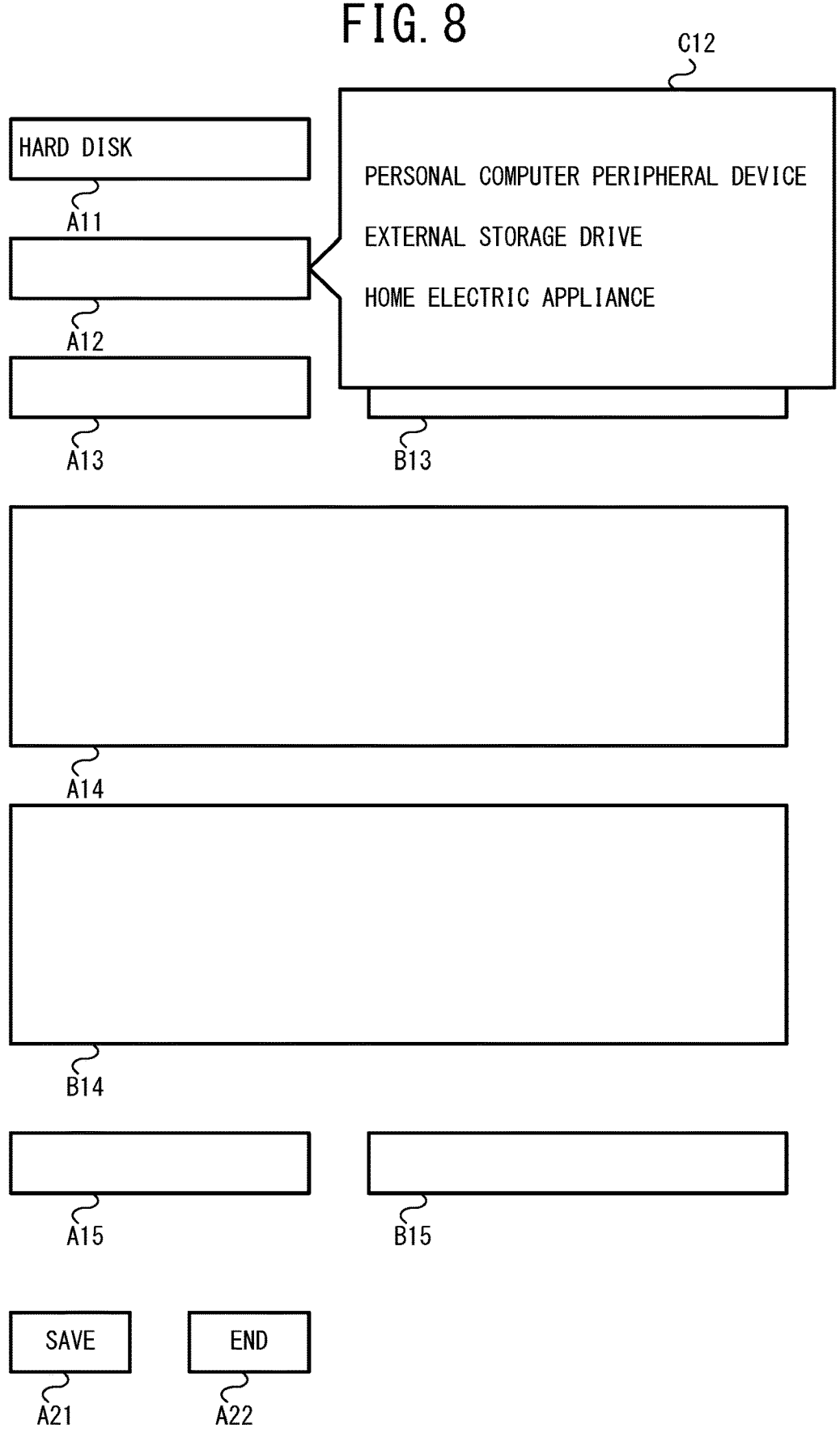
FIG. 8 is a diagram illustrating an example input form with a retrieval result being displayed.
Figure 9:
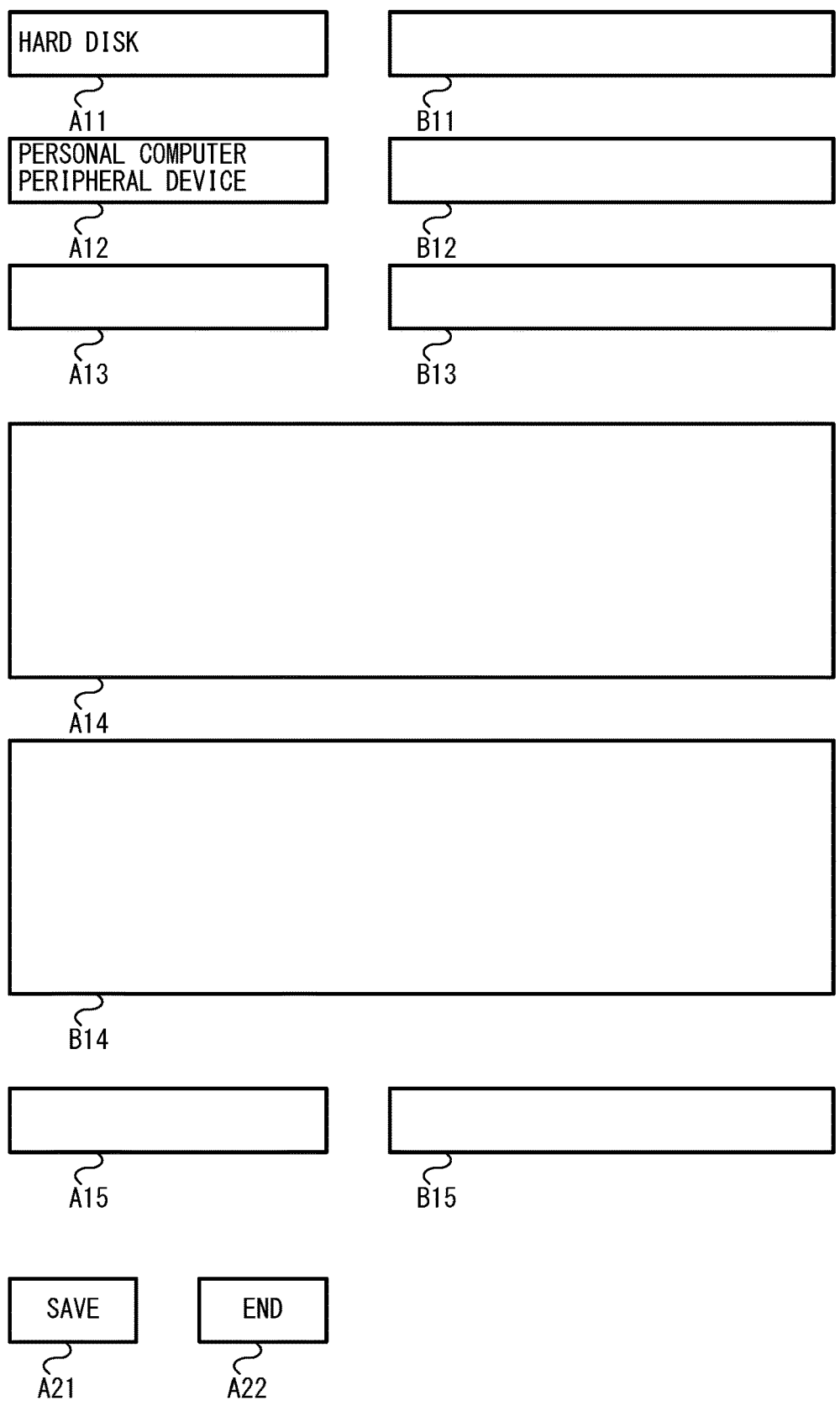
FIG. 9 is a diagram illustrating an example input form when a user selects a result among the displayed retrieval results.

As an example, the user 1 clicks an area where "personal computer peripheral device" is displayed in the result window C12 from the status illustrated in FIG. 8. In this case, the input device 10 detects that an instruction operation of selecting any one (result indicating "personal computer peripheral device") of the displayed retrieval results (in result window C12) is given, and inputs an extracted character string from the selected result to the empty input field. In this case, as illustrated in FIG. 9, the input device 10 automatically inputs the character string "personal computer peripheral device" extracted from the selected result ("personal computer peripheral device") into the input field A12. As explained above, the input device 10 presents, to the user 1, the candidate content for the empty input field based on the details in the filled input field, thereby supporting the inputting operation of information.

Figure 10:
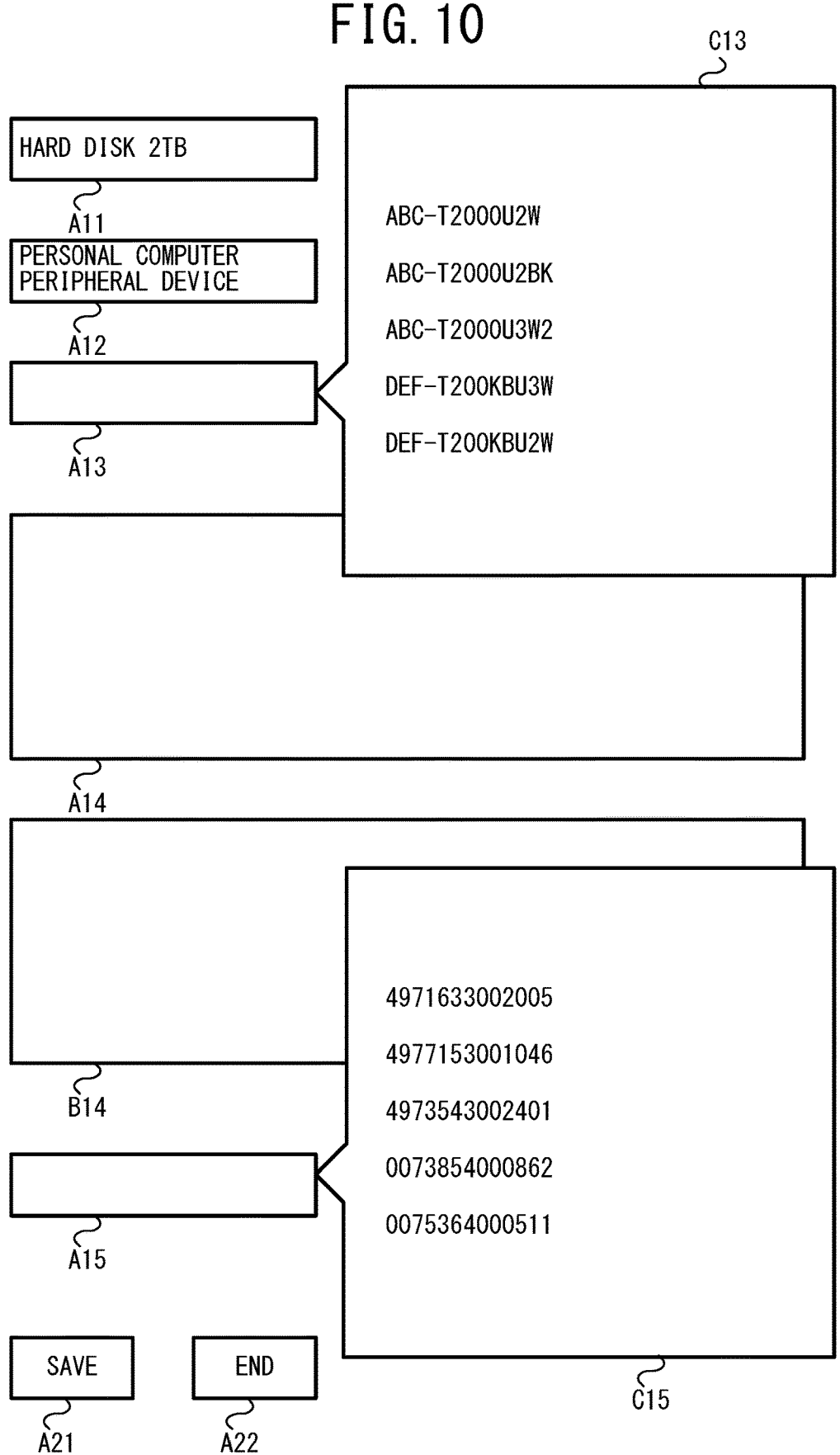
FIG. 10 is a diagram illustrating an example input form with retrieval results being displayed in the multiple input fields.

The number of input fields that are automatically filled by the input device 10 is not limited to one. FIG. 10 illustrates another example case in which the user 1 inputs a character string "hard disk 2 TB" into the input field A11, and also the character string "personal computer peripheral device" into the input field A12. In this example case, the database 19 is retrieved based on the character strings input into the filled input fields (input field A11 and input field A12), and a result window C13 for the input field A13 indicating the manufacturer's model number, and a result window C15 for the input field A15 indicating the JAN code are displayed consequently.

Figure 11:
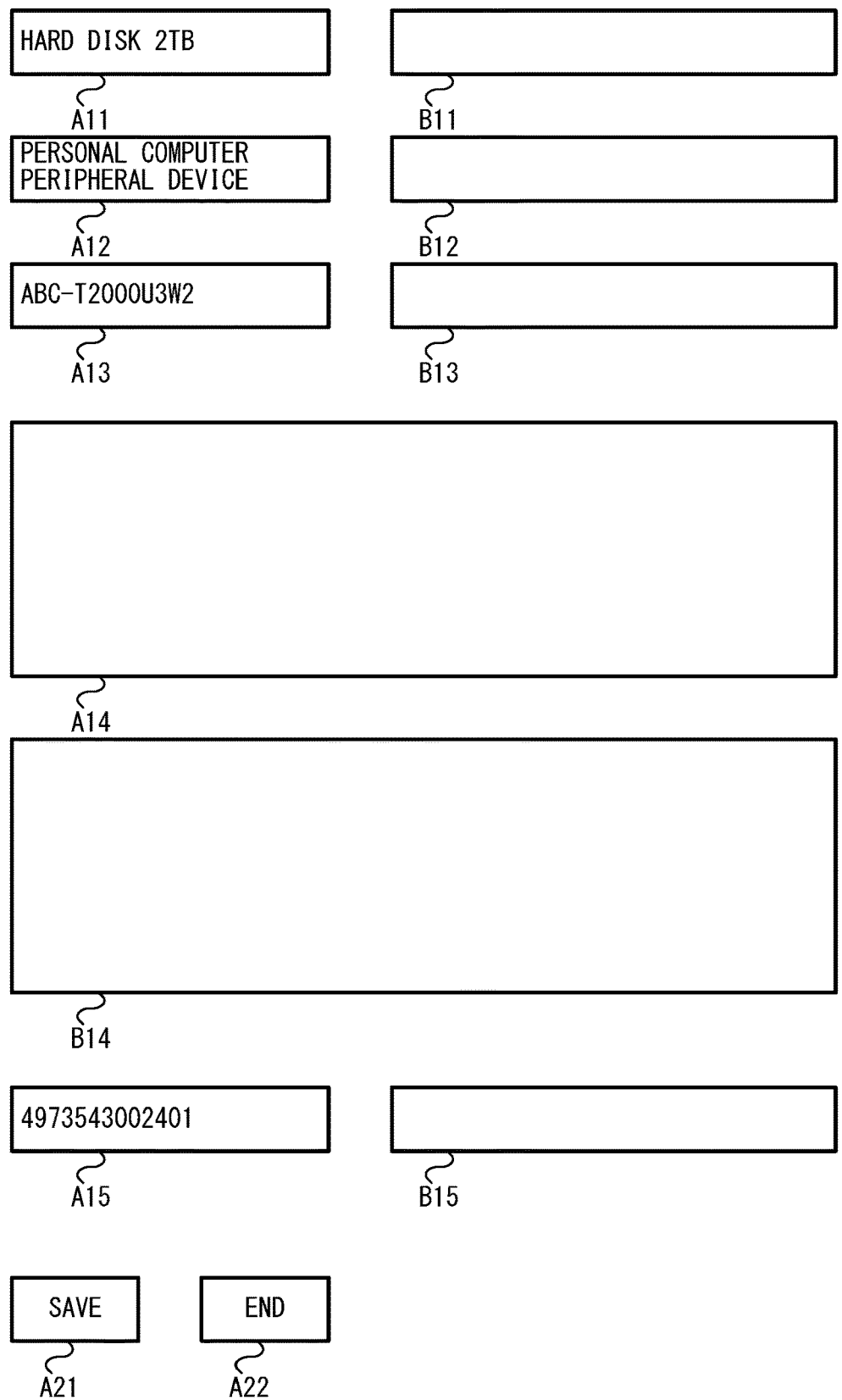
FIG. 11 is a diagram illustrating an example input form when the user selects a result among the displayed retrieval results.

As an example, the user 1 clicks an area where "ABC-T2000U3W2" is displayed in the result window C13 from the status illustrated in FIG. 10. In this case, the input device 10 detects that an instruction operation of selecting any one of the displayed retrieval results (in result window C13) is given, and inputs an extracted character string from the selected result to the empty input field. In this case, the input device 10 extracts the character string "ABC-T2000U3W2" from the selected result ("ABC-T2000U3W2") for the attribute "manufacturer's model number", and also extracts a character string "4973543002401" for the attribute "JAN code". In addition, as illustrated in FIG. 11, the input device 10 automatically inputs the extracted character string "ABC-T2000U3W2" into the input field A13, and the extracted character string "4973543002401" into the input field A15, respectively.

In addition, as explained above, retrieval in the database 19 is performed by partial match retrieval. Hence, what is to be displayed is not always the result matching with the filled input field. Depending on the case, retrieval results that contain contradicting contents with the filled input field are displayed, and the user may select such a contradicting result.

Figure 12:
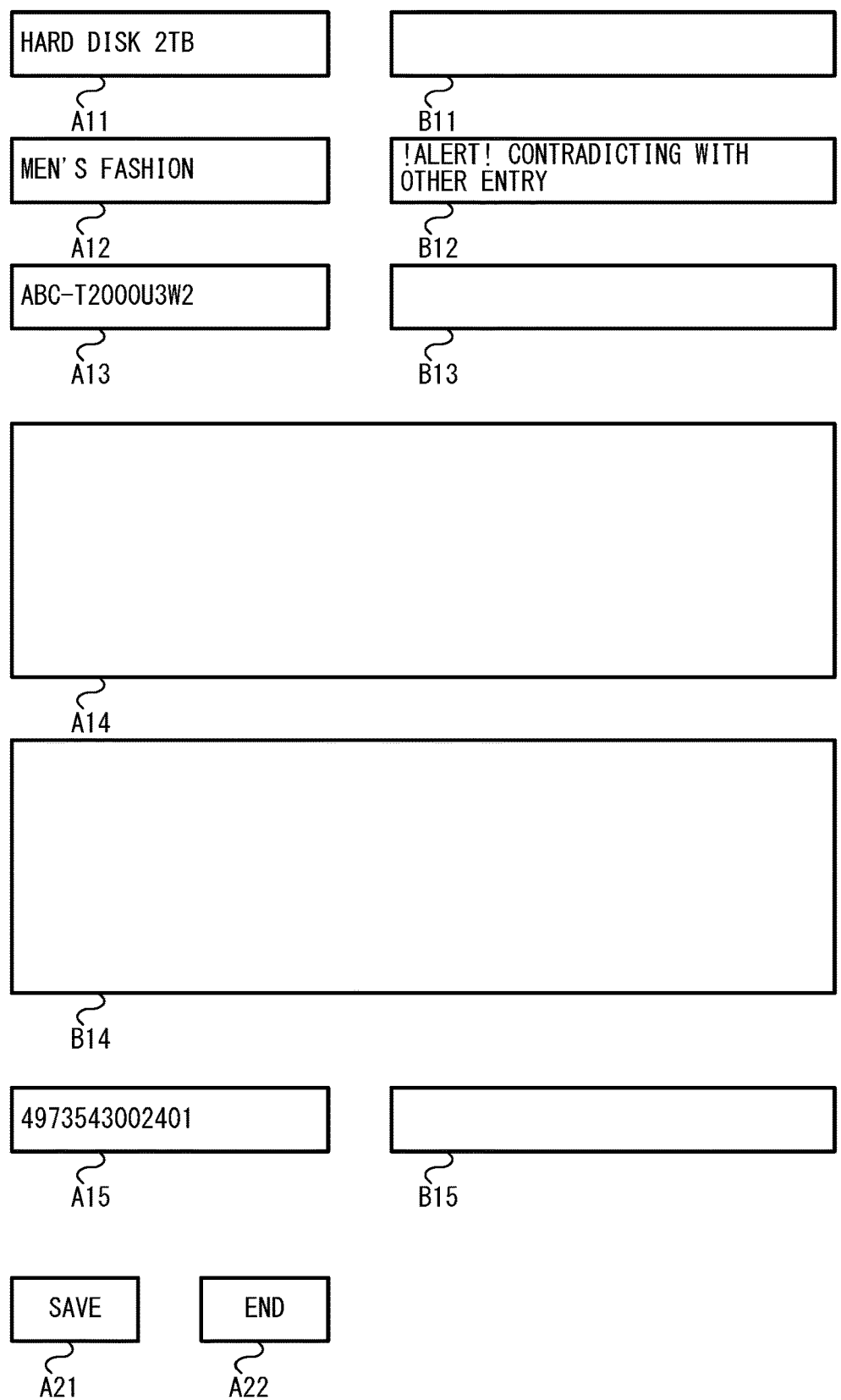
FIG. 12 is a diagram illustrating an example input form with an alert being displayed in an example input field.

FIG. 12 illustrates an input form that has an alert displayed for the contradicting input with the selected result. This is a display example like the example case in FIG. 10 in which the character string "ABC-T2000U3W2" is selected for the attribute "manufacturer's model number", and is also a case in which a character string "men's fashion" is input into the input field A12 indicating the attribute "category name". The character string to be extracted as attribute "category name" from the selected result (product name "hard disk 2 TB", category name "personal computer peripheral device", and manufacturer's model number "ABC-T2000U3W2") is "personal computer peripheral device" that does not match the input character string "men's fashion" into the input field A12. Hence, the input device 10 is displaying a message indicating an occurrence of a contradiction in the corresponding example input field B12 to the input field A12.

Figure 13:
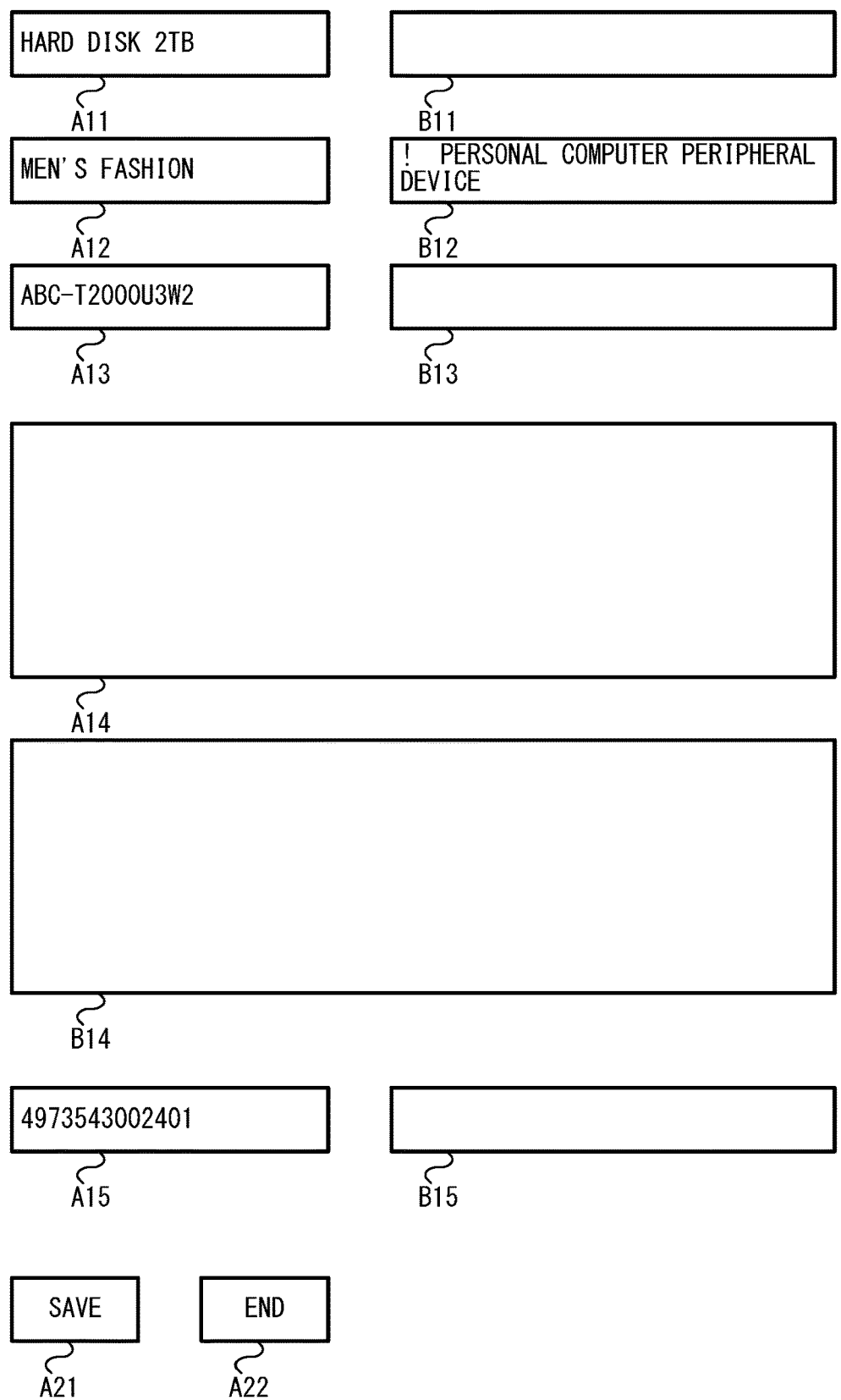
FIG. 13 is a diagram illustrating an example input form with a character string extracted from a selection result being displayed in the example input field together with the alert.

What is to be displayed by the input device 10 when there is a contradicting input is not limited to an alert. For example, as illustrated in FIG. 13, the character string "personal computer peripheral device" extracted from the selected result may be displayed in the example input field B12 together with an alert marking (!), and information associated with the extracted character string from the selected result may be displayed.

As explained above, the input device 10 of this embodiment is capable of compensating for the input field not filled yet, or detecting an improper inputting to the filled input field based in the input details into the input field by the user, and giving an alert to the user. Hence, according to this input device 10, an inputting error caused when the user inputs information to the input form is suppressed.

The input device 10 according to this embodiment performs retrieval based on the character string that has been input, but when the number of matching results exceeds the predetermined number, the retrieval results are not displayed. Hence, candidates are displayed only when the number of matching results is small and is helpful to the user, and thus the inputting operation by the user is efficiently supported.

The input form displayed by the input device 10 includes multiple input fields, and the order of filling such input fields is optional. Hence, the user 1 is capable of causing a manufacturer's model number and a JAN code to be displayed by inputting, for example, a product name into the input field A11, or a product name to be displayed by inputting a JAN code into the input field A15.

In addition, the input device 10 executes retrieval regardless of an instruction operation of starting the retrieval from the user 1, and displays a result. The user 1 is provided with input support by the input device 10 without an inputting operation of a retrieval instruction through another window, or the like. Hence, the input device 10 is capable of suppressing an inputting error without burdening the user 1. Still further, the user 1 is enabled to keep inputting the character string during the execution of retrieval or while the retrieval result is being displayed, and thus an adverse effect to the operation given by the user who does not need input support is avoidable.

In the foregoing embodiment, the explanation has been given of an example case in which the number of databases 19 to which the input device 10 gives query for retrieval is one, but the present disclosure is not limited to this example case. For example, in the case of an Internet marketplace or the like where stores that sell commercial products to customers via the Internet gather, when there is an official database prepared by a marketplace manager, and a product database that stores results which have been input by the users of the respective stores, the input device 10 may give respective queries to such multiple databases.

In addition, the multiple databases may have different priorities. In this case, the input device gives respective queries to the multiple databases with different priorities, and accepts matching results with the respective queries from those respective databases. In addition, when the number of accepted results is equal to or smaller than a predetermined threshold, a matching result from the database that has a higher priority is preferentially displayed relative to the matching result from the database that has a lower priority.

As an example case in which multiple databases that have different priorities are applied, an explanation will be given of an example expected case in which the input device gives respective queries to the official database prepared by the marketplace manager with a higher priority, and the product database storing data given by the users of the respective stores with a lower priority. Since the official database is prepared by the marketplace manager, accurate information is recorded therein encyclopedically. Conversely, the product database is a collection of data input by respective stores (including a store different from the store where the user belongs) that actually sell commercial products, thus containing information not present in the official database (for example, sales price, campaigning information like issuing of coupons, setting of shipping fee).

Since the input device gives retrieval queries to both the official database and the product database, information that needs accuracy, such as the manufacturer's model number of a commercial product and the JAN code, is displayed with information from the more reliable official database being preferentially adopted. Conversely, when the user wants to know information about other stores (for example, sales price and campaigning information), by executing retrieval with information that needs accuracy (manufacturer's model number and JAN code) being input, such information is referable.

In addition, as for information with a specific attribute, the input device may execute a process in accordance with the specific attribute, and may display the information. When, for example, the manufacturer's model number and the JAN code are input into the respective input fields, the input device may tally up the distribution of the sales prices in the retrieval result. The input device may tally up the distribution of the sales prices at other stores, and display the average value, mode value, median value, and the like of the sales price, thereby presenting, to the user, a suggested price of the commercial product.

As for another example of the process relating to the information on the specific attribute, the input device may retrieve the execution status of a campaign at other stores relating to the commercial product based on the input manufacturer's model number and JAN code. In this case, with the user confirming that no campaign is executed at other stores, a button for issuing a coupon for customers may be provided in the commercial product page. In addition, the input device may detect that no campaign is executed at other stores, and may ask the user whether or not to provide a button for issuing a coupon in this case.

As for the other example of the process relating to the information on the specific attribute, the input device may retrieve the setting for the shipping fee at other stores based on the input manufacturer's model number and JAN code. The user may check the setting for the shipping fee relating to the commercial product at other stores, and when none of the other stores sets the shipping fee as free, if the user sets the free shipping fee for the commercial product, a differentiation of the user's store is accomplishable.

In addition, according to this embodiment, the explanation has been given of the input device that supports an inputting operation when the store manager creates a commercial product page, but the present disclosure is not limited to this application. As another example application, an operation of supporting an inputting operation when a general person not limited to the store manager inputs new data to an address list.

For example, the input device that supports data inputting to the address list is expected to display an input form containing three input fields with attributes which are "postal code", "telephone number", and "address".

In Japan, a postal code is constructed of 7-digit numerical data. The postal code data is assigned for each area so as to identify the area more finely as the digit goes down, such as the first and second digits for an area number and the next three digits for a postal delivery zone number. Hence, when, for example, the first digit of the postal code is "1", the corresponding address can be identified as "within TOKYO", and when the first two digits are "12", the corresponding address can be identified as "ADACHI-KU, TOKYO or KATSUSHIKA-KU, TOKYO". In addition, when all seven digits of the postal code are apparent, the residence indication of the corresponding address can be identified, and when, for example, the postal code is "120-0034", the corresponding address can be identified as "SEN-JYU, ADACHI-KU, TOKYO". The same is true of the phone number, and is assigned for each area so as to identify the area more finely as the digit goes down.

When, for example, the user inputs a character string indicating the first two digits in the input field that is "postal code", this input device retrieves in the database based on the input character string indicating the first two digits of the postal code, and extracts a record belonging to the corresponding prefectural and city government from the database in accordance with the retrieval result. When the user inputs the character string "12" in the input field that is "postal code", records to be extracted from the database all have an address "ADACHI-KU, TOKYO" or "KATSUSHIKA-KU, TOKYO". Hence, the input device determines that the number of extracted results is two, and displays the character strings "ADACHI-KU, TOKYO" and "KATSUSHIKA-KU, TOKYO" as retrieval results in the input field that is "address". In addition, since both ADACHI-KU, TOKYO and KATSUSHIKA-KU, TOKYO have the area code that is "03", a character string "03" is displayed in the input field that is "telephone number". The user can select the displayed retrieval result or input the postal code in sequence.

When the user clicks the character string "ADACHI-KU, TOKYO" with the attribute "address" from the displayed result, the input device inputs the character string "ADACHI-KU, TOKYO" to the field with the attribute that is "address". In addition, the input device may generate a query based on the character string "ADACHI-KU, TOKYO" input into "address" based on the newly input details, extracts "120", "121", "123" that are corresponding postal codes to such an address, and displays those postal codes as new retrieval results.

When, for example, the user keeps inputting to the postal code field, and inputs "120-0034" to the postal code field, the input device gives a query to the database based on the newly input details, and displays a character string "SEN-JYU, ADACHI-KU, TOKYO" as a retrieval result in the input field that is "address". As explained above, the user can input information to the input form while being supported by the input device.

As another example operation of such an input device, when the user initially inputs "SENJYU, ADACHI-KU, TOKYO" into the input field that is "address" in the input form, this input device extracts "120-0034" that is a postal code from the retrieval result, extracts "03" that is the first two digits of the telephone number, and displays the extracted results in the respective input fields. As explained above, the order of inputting information to the input form by the user is optional.

In addition, the input details into the input field with the support by the input device are editable later. For example, after "SENJYU, ADACHI-KU, TOKYO" is input into the address input field, and the postal code "120-0034" is input among the displayed selection candidates, the postal code input field may be edited, and another code may be input. In this case, the details in the postal code input field becomes different from the extracted results, and thus the input device gives an alert. Although the alert is being displayed, when the user gives an operation of saving data, the input device records data in accordance with the given operation.

In this embodiment, a case in which a character string is inconsistent with another character string is determined as a contradicting case. However, the present disclosure is not limited to this case. For example, multiple acceptable character strings may be confined beforehand (in a white list) to a specific character string, and even if the character strings are inconsistent with each other, a combination of the specific character string with a character string in the white list may be determined as a non-contradicting case. Conversely, multiple unacceptable character strings may be set (in a black list) to the specific character string, and only a combination of the specific character string with the character string in the black list may be determined as a contradicting case. In addition, other optional exclusive determinations are applicable.

The input device according to an embodiment of the present disclosure is realizable by a general computer system rather than a special-purpose system. For example, a program that causes a computer to execute the foregoing operations may be distributed in a manner stored in a non-transitory computer readable recording medium, such as a flexible disk, a Compact Disk-Read Only Memory (CD-ROM), a Digital Versatile Disk (DVD), or a Magnet Optical Disk (MO), and may be installed in a computer system to accomplish a source-program analyzing system that executes the foregoing processes. In addition, the program may be stored in a disk device, or the like of a server device over the Internet, and may be, for example, downloaded to a computer in a manner superimposed on carrier waves.

In addition, the configuration of the input device according to an embodiment of the present disclosure is not limited to the configuration realized by a single device. Multiple computers may share the foregoing functions, respectively, thereby establishing a system including the multiple computers and providing the respective functions.

Although a preferred embodiment of the present disclosure has been explained above, such embodiment is to explain the present disclosure, and is not to limit the scope of the present disclosure. That is, the scope of the present disclosure is indicated by the appended claims rather than the embodiment. In addition, various modifications carried out within the scope of the appended claims and within the equivalent range thereto should be determined as falling in the scope of the present disclosure.

REFERENCE SIGNS LIST

1 User
10 Input device
11 Display
12 Detector

13 Query generator
14 Compensator
19 Database
110 CPU
111 ROM
112 RAM
120 Storing device
130 Operation device
140 Display device
150 Network interface
190 Internal bus
101, 102, 103, 104, 105 Character string data
A11, A12, A13, A14, A15 Input field
A21 Save button
A22 End button
B11, B12, B13, B14, B15 Example input field
C12, C13, C15 Result window

The invention claimed is:

1. An input device comprising:
at least one memory configured to store program code; and
at least one processor configured to access said at least one memory, read the program code and operate as instructed by the program code, the program code including:
display code configured to cause at least one of said at least one processor to display a form containing a plurality of input fields inputtable in an arbitrary order;
detection code configured to cause at least one of said at least one processor to detect a user operation in the plurality of input fields of the form;
query generation code configured to cause at least one of said at least one processor to when the detected user operation is an inputting and editing operation for a character string in any of the plurality of input fields of the form, generate a query in a database based on the character string having been input into non-empty input fields containing a first input field and a second input field among the plurality of input fields, and accept search results retrieved for the generated query in the database by partial match; and
extracting code configured to cause at least one of said at least one processor to extract, from the retrieved search results respectively, attribute character strings corresponding to a third input field that is empty among the plurality of input fields,
wherein:
the display code is further configured to cause at least one of said at least one processor to display the extracted attribute character strings together with the third input field of the form, and
the program code further includes:
detecting code configured to cause at least one of said at least one processor to detect an instruction operation of selecting any of the displayed attribute character strings and select a search result corresponding to the selected attribute string; and
compensator code configured to cause at least one of said at least one processor to, when any of the search results is selected:
(a) input the selected attribute character string into the third input field;
(b) identify a second field search result character string that corresponds to the selected search result;
(c) determine whether the character string that has been input into the second input field contradicts the second field search result character string; and
(d) generate a character string alert for the second input field that comprises the second field search result character string when the character string that has been input into the second input field contradicts the second field search result character string.

2. The input device according to claim 1, wherein the display code is further configured to cause at least one of said at least one processor to display the character string alert in a display field corresponding to the second input field not empty when the character string that has been input into the second input field not empty contradicts the extracted character string from the selected search result for the third input field.

3. The input device according to claim 2, wherein the display displays information associated with the extracted character string in the display field corresponding to the second input field not empty when the character string that has been input into the second input field not empty contradicts the extracted character string from the selected search result for the third input field.

4. The input device according to claim 2, wherein the character string alert comprises a plurality of characters.

5. The input device according to claim 1, wherein:
the database includes a plurality of databases with different priorities;
the query generator code is further configured to cause at least one of said at least one processor to generate respective queries for retrieval in the plurality of databases based on the character string that has been input, and accepts matching search results with the queries; and
the display code is further configured to cause at least one of said at least one processor to preferentially display the matching search result from the database with the higher priority than the matching search result from the database with the lower priority when the number of accepted search results is equal to or smaller than a predetermined threshold.

6. A form inputting method comprising:
displaying a form containing a plurality of input fields inputtable in an arbitrary order;
detecting a user operation in the plurality of input fields of the form;
when the detected user operation is an inputting and editing operation for a character string in any of the plurality of input fields of the form, generating a query in a database based on the character string having been input into non-empty input fields containing a first input field and a second input field among the plurality of input fields, and accepting search results retrieved for the generated query in the database by partial match; and
extracting, from the retrieved search results respectively, attribute character strings corresponding to a third input field that is empty among the plurality of input fields,
wherein the displaying further comprises displaying the extracted attribute character strings together with the third input field of the form, and wherein the method further comprises:
  detecting an instruction operation of selecting any of the displayed attribute character strings and selecting a search result corresponding to the selected attribute string; and
  when an instruction operation of selecting any of the displayed at least one search result is detected:
    (a) inputting the selected attribute character string into the third input field;
    (b) identifying a second field search result character string that corresponds to the selected search result;
    (c) determining whether the character string that has been input into the second input field contradicts the second field search result character string; and
    (d) generating a character string alert for the second input field that comprises the second field search result character string when the character string that has been input into the second input field contradicts the second field search result character string.

7. A non-transitory recording medium having stored thereon a program which, when executed by a computer, causes the computer to:
  display a form containing a plurality of input fields inputtable in an arbitrary order;
  detect a user operation in the plurality of input fields of the form;
  when the detected user operation is an inputting and editing operation for a character string in any of the plurality of input fields of the form, generate a query in a database based on the character string having been input into non-empty input fields containing a first input field and a second input field among the plurality of input fields, and accept search results retrieved for the generated query in the database by partial match; and
  extract, from the retrieved search results respectively, attribute character strings corresponding to a third input field that is empty among the plurality of input fields,
  wherein the display of the form comprises displaying the extracted attribute character strings together with the third input field of the form, and
  wherein the program further causes the computer to:
    detect an instruction operation of selecting any of the displayed attribute character strings and select a search result corresponding to the selected attribute string; and
    when an instruction operation of selecting any of the displayed at least one search result is detected:
      (a) input the selected attribute character string into the third input field;
      (b) identify a second field search result character string that corresponds to the selected search result;
      (c) determine whether the character string that has been input into the second input field contradicts the second field search result character string; and
      (b) generate a character string alert for the second input field that comprises the second field search result character string when the character string that has been input into the second input field contradicts the second field search result character string.

8. The input device according to claim 1, wherein the display code is further configured to cause at least one of said at least one processor to display, when the number of accepted results is equal to or smaller than a predetermined threshold, the search results together with the form.

9. The input device according to claim 1, wherein each input field is provided for and corresponds to each attribute to be accepted by the input device,
  the database comprises a plurality of records each having multiple pieces of character string data associated with one another, each piece of character string data corresponding to a respective attribute, and
  whether the character string that has been input into the second input field not empty contradicts the second field search result character string from the selected search result for the third input field is determined based on whether the character string that has been input into the second input field not empty does not match with the second field search result character string that corresponds to an attribute of the second input field in a record of the selected search result that is selected for the third input field.

10. A form inputting method comprising:
  displaying a form containing a plurality of input fields having attributes respectively;
  detecting, from among the plurality of input fields, an active input field that a user gives an inputting and editing operation into;
  generating, a query for retrieval in a database based on:
    a character string being input into the detected active input field; and
    character strings having been filled into other non-empty input fields among the plurality of input fields;
  accepting search results matching with the query;
  extracting, from the accepted search results respectively, attribute character strings corresponding to an empty input field among the plurality of input fields,
  displaying the attribute character strings corresponding to the search results together with the displayed form;
  detecting, from among the displayed attribute character strings, a search result corresponding to an attribute character string that the user selects;
  inputting the selected character string into the empty input field;
  identifying a second input field search result character string that corresponds to the selected search result;
  determining whether the character string that has been input into one of the other non-empty input fields contradicts the second field search result character string; and
  generating a character string alert for the one other non-empty input field that comprises the second field search result character string when the character string filled into the one other non-empty input field contradicts the second input field search result.

11. The form inputting method according to claim 10 wherein the retrieval in the database is executed by partial match.

12. The form inputting method according to claim 10, wherein the query is generated further based on:
  an attribute that the detected active input field has; and
  attributes that the other non-empty input fields have respectively.

* * * * *